| United States Patent [19] | | [11] | 3,917,721 |
|---|---|---|---|
| Frampton | | [45] | Nov. 4, 1975 |

[54] OLEFIN HYDRATION USING PHOSPHORIC ACID ON POROUS SILICA XEROGEL

[75] Inventor: Orville D. Frampton, Wyoming, Ohio

[73] Assignee: National Distillers and Chemical Corporation, New York, N.Y.

[22] Filed: Dec. 17, 1973

[21] Appl. No.: 425,437

[52] U.S. Cl. ............ 260/641; 252/437; 260/614 A; 260/643 B; 423/335
[51] Int. Cl.² ......................................... C07C 29/08
[58] Field of Search ...... 260/641; 423/335; 252/437

[56] References Cited
UNITED STATES PATENTS

| 2,569,092 | 9/1951 | Deering | 260/641 |
|---|---|---|---|
| 2,827,500 | 3/1958 | Bloecher et al. | 260/641 |
| 2,960,477 | 11/1960 | Smith et al. | 260/641 |
| 3,340,313 | 9/1967 | Mitsutani | 260/641 |
| 3,367,742 | 2/1968 | Marotta et al. | 423/335 |
| 3,459,678 | 8/1969 | Hagemeyer et al. | 260/641 |

FOREIGN PATENTS OR APPLICATIONS

| 2,237,015 | 2/1973 | Germany | 260/641 |
|---|---|---|---|

*Primary Examiner*—Joseph E. Evans
*Attorney, Agent, or Firm*—Allen A. Meyer, Jr.

[57] ABSTRACT

An improved olefin hydration catalyst is disclosed and comprises phosphoric acid supported on a particular type of porous silica xerogel which has been treated with steam under particular temperature conditions.

12 Claims, No Drawings

OLEFIN HYDRATION USING PHOSPHORIC ACID ON POROUS SILICA XEROGEL

BACKGROUND OF THE INVENTION

The use of silica gel as a support for catalysts is well known. The silica gel is a colloidal system of solid character comprised of colloidal particles of a condensation polymerized silicic acid in a hydrated state which forms a coherent structure. It is an assembly of small, impervious, dense, roughly spherical (diameter roughly 100 A) particles in a rather open or loose random packing. The particles are believed to be spherical since the gels are not crystalline. It is believed that the spheres are bonded together by bridges or fillets of the same material. The pore system within the aggregate is formed by the open spaces between the elementary particles and the porous texture, as characterized by the specific surface area, pore volume and pore diameter, depends on the size and the packing of the elementary particles. There are generally two forms of silica gel — xerogel and aerogel.

An aerogel is a gel in which the liquid phase of a gelled silicic acid solution has been replaced by a gaseous phase in such a way as to avoid the shrinkage which would occur if the gel had been dried directly from a liquid. For example, Kistler prepared silica aerogels by replacing most of the water in the gel with alcohol, heating the gel in an autoclave above the critical temperature of the alcohol so that there was no meniscus between the liquid and gas phases, and venting the vapors. In this way, liquid phase was removed without subjecting the gel structure to the compressive forces due to the surface tension of the liquid-gas interface.

Xerogels are prepared by removal of the water by evaporation from an aqueous gelled silicic acid solution. Evaporation of the liquid phase forms menisci in the pores at the surface of the gel so that the surface tension of the liquid exerts a strong compression on the gel mass. The degree to which the gel can be densified depends on the equilibrium between the compression due to the surface tension and the resistance to compression by the gel framework. Compression will increase with smaller pore diameters; resistance to compression depends upon the strength of the gel which increases with higher packing density and more strongly coalesced structures. Thus, gels of high specific surface, made up of extremely small ultimate silica units and formed at low silica concentration, shrink greatly and crack into fragments upon being dried.

Much of the technology of silica gels involves the problem of making a strong hard gel mass which will not shrink or crack upon being dried and which will be suitable as a catalyst base. On the other hand, there has evolved a considerable art in producing extremely light, friable gels which will break down easily into fine powders for use as fillers in plastics, rubber and the like. This type of xerogel is not suitable for fixed bed catalyst supports.

Other solid forms of silica include the crystalline quartz, tridymite and cristabolite, and these are generally not suitable as catalyst supports because, in part, they are non-porous. The same is true of opal, an amorphous form of silica.

Pelleted diatomaceous earth is a naturally occurring form of siliceous material which is sometimes used as a catalyst support because it has a porous structure and is relatively crush-resistant. However, it also contains alumina and iron impurities which may be harmful to many catalytic reactions.

There is a significant amount of technical literature relating to combining a type of hydrothermal treatment of silica gel with its use as a catalyst support. For example, Czarny et al, Przem. Chem. 46 (4), 203–207 (1967), studied the effect of water pressure (a hydrothermal treatment) and suggested the use of these gels to study the influence of pore structure on catalytic properties. German Offen. 2,127,649 teaches preparing macroporous silica gel spheres by heating them in steam and aqueous ammonia for 3 hours at 10 bars and the resulting material is reported to be useful for catalytic processes. French patent 1,585,305 refers to a method for hardening the surfaces of silica gel without degrading its activity or altering its properties using a heat treatment in a lower alcohol vapor with 10% of its volume as water. Schlaffer et al, J. Phys. Chem. 69 (5), 1530–6 (1965), examined the physical changes that occur to silica and alumina gels upon exposure to steam at moderate to high temperatures and found the surface area and pore volume of silica gel to be less stable to prolonged steaming than those of silica-alumina cracking catalysts.

Other technical literature relates to increasing the crushing strength of silica gel by a steam or water treatment. See, e.g., Bodnikov et al, Zh. Prikl. Khim. 38 (10), 2157–65 (1965) and Sultanov, USSR Pat. No. 281,431. A number of other papers deal with the steam treatment of silica gel to alter pore characteristics.

Micropores are here defined as those measurable by the BET nitrogen adsorption method (see Barrett, The Determination of Pore Volume and Area Distributions In Porous Substances, J. Am. Chem. Soc. 73, 373 (1951) at $P/P_o = 0.967$ which corresponds to pore diameter of 600 A or less. Macropores are here defined as all other pores contributing to the total porosity. In terms of pore volume, total pore volume, measurable by the method of Innes (Analytical Chemistry 28, No. 3 (March 1956), comprises pore volume due to micropores (measurable by the BET nitrogen adsorption method) plus pore volume due to macropores. The definition is consistent with one given by Innes.

German Offen. 2,237,015 relates to a phosphoric acid hydration catalyst supported on a treated silica gel carrier. The silica gel carrier material is treated with steam or a mixture of steam and nitrogen at a temperature of 200°–350° C., preferably 250°–300° C., and a pressure of 30–1500 psig to obtain a material of increased crushing strength.

I have found, however, that this treatment irreversibly changes the pore structure of the intermediate density xerogel from one in which all the pores were the desirable micropores into one in which substantially all the pores are macropores.

Although the German patent teaches that the steam treatment of the silica gel will increase its crush strength, it is important to note that the crush strength of the gel is not, per se, transferrable to the catalyst. For example, as is demonstrated in Example 1 below, a sample of virgin grade 57 ID silica xerogel has an average crush strength of 4.7 pounds with 14% equal to or less than 2 pounds while a phosphoric acid olefin catalyst made from that xerogel has a much lower average crush strength of 2 pounds with 72% equal to or less than 2 pounds. Therefore the phosphoric acid impregnated steam treated silica gel catalysts of the German Offen. could be expected to have a crush strength intermediate between the crush strength of the steam treated gel per se and the same catalyst where the gel has not been steam treated, although not necessarily in excess of the average crush strength of the virgin silica gel.

I have now found that by steam treating silica xerogel by a procedure which is different from the German Offen., a xerogel with a pore structure containing a substantial proportion of desirable micropores, yet also of improved crush strength can be obtained and, very surprisingly, the improved crush strength is transferrable to the supported catalyst.

Accordingly, it is the object of this invention to provide an improved phosphoric acid olefin hydration catalyst having a substantial proportion of micropores and an average crush strength superior to that obtained in the prior art. This and other objects of the invention will become apparent to those skilled in the art from the following detailed description.

SUMMARY OF THE INVENTION

This invention relates to an olefin hydration catalyst and more particularly relates to an olefin hydration catalyst comprised of aqueous phosphoric acid supported on a partly microporous silica xerogel which has been treated with steam under certain specific temperature conditions.

DESCRIPTION OF THE PREFERRED EMBODIMENTS

In accordance with the preferred embodiment of the present invention, a partly microporous silica xerogel of improved crush resistance is first prepared and then is impregnated with phorphoric acid for use as a fixed bed vapor phase olefin hydration catalyst. While total saturation of the pores produces a workable catalyst, incomplete saturation may be desirable for certain types of reactor metals subject to corrosion. As noted above, xerogels can be produced as strong, hard masses or as extremely light, friable gels. Only the former is suitable for the catalyst of this invention.

Accordingly, the silica gel used to prepare the catalyst of this invention must be an intermediate density silica xerogel which is relatively inert to aqueous $H_3PO_4$ and characterized by the following properties:

| | |
|---|---|
| Particle size: | passes through 3 mesh and retained on 20 mesh, preferably retained on 12 mesh (U.S. Standard Sieve Series) |
| Bulk density: | 0.38–0.48 g/cc. preferably 0.40–0.45 |
| Pore volume: | 0.80–2.2 ml/g. preferably 0.85–1.3; more than 95% of the pores being micropores having an average pore diameter (determined by the mercury porosimeter) of 100–200 A |
| BET surface area: | 200–500 m²/g |
| Chemical Composition: | $SiO_2$ >99w% (dry basis) |
| | $Fe_2O_3$ 0.01–0.03 w% (dry basis) |
| | $N_2O$ 0.02–0.09w% (dry basis) |
| | $Al_2O_3$ <0.4w% (dry basis) |
| Crush strength (dry) of 50 particles: | 2.2–5.0 pounds |

The average crush strength of the xerogel is determined with a Chatillon Pellet Strength tester which measures the minimum force necessary to just crush a particle between parallel plates. The average crush strength of the steam treated silica gel of this invention, after impregnation with aqueous phosphoric acid, wet or dry, will be at least twice that for a similarly impregnated but untreated gel with not more than 15% of the gel particles having a crush strength of 2 pounds or less.

The silica xerogel must also be mechanically and chemically stable during long exposure to steam at 300°–350° C.

Suitable silica xerogels are commercially available. Examples include grade 57 intermediate density (ID) silica gel manufactured by Davison Chemical Company, Division of W. R. Grace & Co., Baltimore, Md., and 3–12 mesh intermediate density silica gel manufactured by Eagle Chemical Co., Mobile, Alabama.

The granular silica xerogel is placed into a reactor which is then sealed from the atmosphere and purged of air with an inert gas such as nitrogen or the like. The xerogel is exposed to water vapor or it is heated under pressure until the treatment temperature is reached at both the inlet and outlet zones of the reactor. Heating can be accomplished by heating the reactor or by passing a hot flowing inert gas, optionally saturated with water vapor through the reactor. It is important, however, that no liquid water be present.

Once the appropriate temperature and pressure conditions are attained, the gel is steamed for a period of time which can range from 4-16 hours. The water vapor can be used by itself or can optionally be diluted with an inert gas such as nitrogen or ethylene. Total pressure employed will be in the range of 40 psi to 1500 psi and the water vapor will contribute a partial pressure in the range of 40–225 psi, preferably 60–130 psi. The treatment temperature is at least 135° C. and care is taken not to allow the temperature to attain a level of 200° C. or above. Preferably the temperature is about 145°–175° C. When the xerogel is heated to thte treating temperature from ambient temperature, the vapor above the xerogel preferably should be saturated with water up to at least 149° C. Thereafter the xerogel is allowed to cool to ambient temperature or cooling is accelerated by circulation of a cool dry inert gas such as nitrogen through the gel. Ethylene is also satisfactory as a cooling gas. After the gel has been cooled, the reactor is depressurized to atmospheric pressure or below.

Alternatively, the silica xerogel can be charged into a pressure vessel which is then pressurized with an inert gas. The xerogel is then heated while water in the vapor state only is allowed to admix with the inert gas which surrounds the gel. The inert gas is kept saturated with water vapor. This may be accomplished, for example, by initially charging liquid water into the vessel while keeping it separate and out of contact with the xerogel. The reactor is then closed, pressurized and heated externally. In this case, the liquid water is also heated and caused to vaporize, saturating the gas blanket with water vapor at all temperatures. The amount of water can be limited so as to be fully vaporized at treatment temperature. At the end of the treatment, the vessel is depressurized at the treatment temperature, and swept with cool, moist inert gas to cool to ambient temperature without dehydration of the xerogel yet not allowing liquid water condensation on the gel.

The resulting xerogel is characterized by:

| | |
|---|---|
| Particle size: | passes through 3 mesh and retained on 20 mesh, preferably retained on 12 mesh |
| Bulk density: | 0.38–0.48 g/cc, preferably 0.40–0.45 g/cc |
| Pore volume: | 0.80–1.3 ml/g; about 19–100% as micropores (600 A diameter) |
| BET surface area: | 20–500 m²/g |
| Crush strength (dry) of 50 particles: | 4.4–15 pounds |

Mechanically stable to aqueous solutions and steam to 350° C.

After the steam treatment, the xerogel is impregnated with the phosphoric acid olefin hydration catalyst. This can be accomplished by charging the xerogel into a vessel containing aqueous phosphoric acid or by charging phosphoric acid into a vessel containing the gel, as desired. In either event, enough acid is used to cover the gel which is allowed to soak therein for an appropriate length of time after which the acid is allowed to drain off. The soaking process can be repeated one or more times as desired. Alternatively, the $H_3PO_4$ solution may be sprayed into the xerogel for a period of time using very small drop size, 0.001–0.005 mm, until the xerogel is saturated. The impregnated gel is then dried in any suitable manner such as by contact with heated circulating inert gas at elevated temperature to yield the catalyst.

The phosphoric acid used to impregnate the xerogel is employed as an aqueous solution in which the acid concentration is in the range of 40–70%, and preferably in the range of 55–60%. It has been found that about 210–250 pounds of 55% acid are required for each three cubic feet of steamed xerogel. The impregnation temperature can be in the range of 20°–200° C. but is preferably in the range of 25°–50° C. The gel is usually allowed to soak in the acid for 15 minutes to 4 hours, and preferably for 30–60 minutes. A longer time can be used if desired but is generally unnecessary. The excess liquid acid is usually allowed to drain off for 0.5–2 hours. The aqueous solvent for the phosphoric acid can optionally contain ethanol and/or a small percentage of a wetting agent such as polyoxyethylene to assist in filling the smaller micropores of the gel with acid.

The drying of the impregnated gel is preferably done under flow of a suitable gas such as nitrogen or ethylene with heat supplied either externally to the reactor or by preheating the gas. The latter procedure is preferred. The temperature of the gel should be brought up to about 150° C. and held there until the outlet temperature reaches about 120° C. This temperature is then maintained for about 0.25–5 hours, preferably about 2 hours. The drying of the gel is also preferably carried out under pressure. A pressure of 15–1500 psi is generally suitable with 600 psi being especially desirable.

The supported catalyst of the present invention is used to hydrate olefins into alcohols. The catalyst can be used in any of the known processes and is particularly useful in the conversion of monoolefins of 2–10 carbon atoms such as ethylene, propylene and butylene. It is particularly useful in the ethylene hydration to ethanol and diethyl ether. The hydration reaction generally comprises bringing a gaseous mixture of olefin and water into continuous contact with the catalyst at elevated temperatures and pressures. This process, per se, is well known in the art and need not be described in any more detail here.

In the preferred ethylene hydration process, a reaction temperature of 235°–350° C., preferably 245°–300° C., a pressure of 500–1500 psig, preferably 900–1250 psig, a mol ratio of water to ethylene of 0.4–2.0, preferably 0.5–0.8, and a vapor velocity of 5–100 SCFM/ft³ catalyst, preferably 15–35 SCFM/ft³ [standard cubic feet per minute per cubit foot of catalyst; standard conditions being 1 atmosphere pressure and 60° F. (ca 25° C.) temperature] are used.

Electron micrographs of silica gel show that the physical structure can be described as a coherent aggregate of elementary particles of roughly spherical shape having a diameter of the order of 100 A. The elementary particle is an irregular three dimensional network of $SiO_4$ tetrahedra, each silicon atom being linked to four oxygens and each oxygen being linked to two silicons. At certain sites, the elementary particles may be linked together by Si—O—Si bridges. The particle surface is covered with hydroxyl groups which are responsible for the hydrophilic nature of normal silica gel.

The steaming process involves a vapor phase transport of matter resulting in the growth of large elementary particles at the expense of small ones, and resulting in the enlargement of the pores and loss in surface area. The transport of solid material during steaming results in the formation of fillets between the particles by deposition of the material in the regions of contact. Undoubtedly this contributes to the enhanced crust strength of the gel and the irreversible loss of microporosity and corresponding increase in macroporosity. Increased resistance to crushing could also be related to an additional mechanism involving the rearrangement of the elementary particles to form a more compact packing occurring as a response to stresses such as Van der Walls forces and to stresses caused from the shrinkage and sometimes disappearance of some of the smaller particles. The transport of material from a small elementary particle to a larger one is of molecular character. The silica gel skeleton is not affected during this process and, therefore, the pore volume does not change. The change not only results in the increased resistance to crushing of the dry xerogel granule but also of the xerogel granule impregnated with phosphoric acid solution.

At the lower temperatures and less drastic conditions of the instant process, as contrasted with the process described in German Offen. 2,237,015, only a portion of the pores are enlarged to the size of macropores (over 600 A). Wicke, Kolloidzeitschrift 86, 167 (1939) found, in studies of silica gel containing both micropores and macropores, that the surface area available in macropores is negligible in comparison with that in the micropores.

There is a loss of phosphoric acid from the catalyst during a hydration operation by a mechanism which is not known. One hypothesis is that a reaction between ethylene and phosphoric acid takes place in the pores to form a volatile but thermally unstable ethyl phosphate. A portion of this material volatilizes out of the pores before decomposing to phosphoric acid and ethylene or before its reaction with water to form alcohol and phosphoric acid. Thus, $H_3PO_4$ may be brought out of the pores. The same reaction may take place outside the pores, where the high linear gas velocity allows for a much more rapid movement before decomposition or reaction takes place. The process continues until the acid passes out of the reactor. It is believed that the diffusion of the ethyl phosphate out of the pores is more rapid with macropores than with micropores. This is based on evidence that in gas phase reaction over porous catalysts, Knudsen, or molecular flow, rules the rate of transport in the pores where there are micropores (in which the mean free path between intermolecluar collisions of the gas molecules is greater than the pore diameter) whereas in macropores (where the magnitude of the mean free path and pore diameter are reversed) the more rapid ordinary diffusion predominates.

The advantages of micropores and macropores are suggested by Broekhoff (Chap. 1 of Physical and Chemical Aspects of Adsorbents and Catalysts, Linsen, Ed., Academedic Press, London (1970) as follows:

"Catalysts operate via the adsorption of molecules, and the surface area that is available for this adsorption is of major importance. This surface area is determined by the surface area in the micropores. Nevertheless, macropores play an important role in the operational use of these substances, since the rates of adsorption and the rates of the catalystic reactions depend largely on the rate of diffusion in the pores."

It will be recognized that the discussion above relates to the theory behind the invention. It has been set forth to assist in understanding the nature of this invention but I do not wish to be limited thereby. Whatever the reasons for the advantages obtained, it is clear that the catalyst and catalyst supports treated in accordance with this invention have substantially different physical characteristics, particularly with respect to micropore-macropore distribution and crush resistance, than the materials disclosed in German Offen. 2,237,015. As will be seen in Table I, a substantial proportion (19–100%) of the total pore volume of the silica xerogel remains in the form of micropores (average pore diameter 600 A or less) when steaming is carried out in accordance with the invention but over 93% of the pore volume is in the form of macropores when temperatures in excess of 200° C. (392° F.) as suggested in the German Offen. are used.

TABLE I

| Steam Treatment | | Pressure, psi | | Micropore Volume cc/g | Micropore Volume As % of Total Pore Volume |
|---|---|---|---|---|---|
| Temp. °C | Time/Hrs | Total | Partial $H_2O$ | | |
| Original ID Xerogel | | | | 1.09 | 100 |
| 150 | 6 | 705 | 67 | 1.16 | 96 |
| 150 | 16 | 705 | 67 | 1.09 | 100 |
| 150 | 16 | 705 | 67 | 0.73 | 69 |
| 150 | 16 | 452 | 67 | 0.54 | 51 |
| 150 | 16 | 505 | 67 | 0.62 | 59 |
| 150 | 16 | 1014 | 58 | 0.53 | 50 |
| 177 | 16 | 769 | 134 | 0.20 | 19 |
| 205 | 16 | 615 | 231 | 0.04 | 3.8 |
| 205 | 16 | 614 | 176 | 0.06 | 5.7 |
| 205 | 16 | 881 | 247 | 0.076 | 7.2 |
| 260 | 16 | 1015 | 381 | 0.029 | 2.8 |
| 260 | 16 | 614 | 230 | 0.02 | 1.9 |
| 260 | 16 | 615 | 176 | 0.007 | 0.67 |

The effect of steam treatment of an intermediate density silica gel on crush strength of the corresponding olefin hydration catalyst can be seen from the following. A Davison grade 57 ID silica gel (retained on 6 mesh) was impregnated with 55% $H_3PO_4$ solution. The same gel was steamed prior to acid impregnation for 16 hours at 149° C. under 690 psi pressure using nitrogen saturated with water vapor. The results are shown in Table II.

TABLE II

| Treatment | BET Surface Area, $m^2/g$ | Micropore Volume, ml/g | Average Pore Diameter, A | Amount $H_3PO_4$ Loading $lb/ft^3$ | Crush Strength % < | |
|---|---|---|---|---|---|---|
| | | | | | Av.lbs | 2 lbs |
| Not steamed | 280 | 1.05 | 150 | 21.53 | 2 | 72 |
| Steamed | 70 | 0.73 | 415 | 22.19 | 6.7 | 6 |
| Xerogel per se | 350 | 1.05 | 120 | 0.0 | 4.7 | 14 |

Thus, it is shown that the steam treatment of the xerogel resulted in a greatly strengthened catalyst particle with respect to the mechanical crushing while still retaining substantial microporosity, and without appreciably affecting the capacity to adsorb $H_3PO_4$ into the pores; total pore volume remains substantially the same.

A further demonstration of the enhanced resistance to crushing of the catalyst as a result of the steam treatment of the present invention is the crush strength after wetting the catalyst with liquid water. A sample of catalysts prepared from unsteamed grade 57 ID silica gel with phosphoric acid impregnation as outlined above exhibited crush strengths of the following average values:

prior to impregnation: 4.7 lbs
after impregnation and drying: 1.5 lbs
after wetting the catalyst with liquid water: 0.5–0.7 lbs.

Thus, wetting an already weakened catalyst with liquid water drastically reduced its strength so as to make it practically useless in fixed bed vapor phase operation since it crushes to powder too easily causing a prohibitively excessive pressure drop in the hydration reactor.

On the other hand, catalysts similarly prepared from grade 57 ID silica gel which had been steamed for 16 hours at 177° C. and under 755 psi pressure using nitrogen saturated with water vapor exhibited crush strengths of the following average values:

| | |
|---|---|
| prior to impregnation: | 5.7 lbs with 10% ≤ 2 lbs |
| after impregnation and drying: | 6.9 lbs with 4% ≤ 2 lbs |
| after wetting with water: | 5.6 lbs with 10% ≤ 2 lbs |

The treatment did not appreciably alter the catalytic olefin hydration activity of the catalyst. While this catalyst shows some loss in strength (resistance to crushing) upon being wetted with water, enough crush resistance is retained for practical use as a fixed bed catalyst. This is an immense advantage in that inadvertent condensation of water in the reactor during operation of vapor phase olefin hydration reactions will not destroy the catalyst causing a shut-down for catalyst replacement.

An improved fixed bed hydration catalyst with improved crush resistance and substantial microporosity can also be obtained by subjecting the $H_3PO_4$ impregnated xerogel to the steaming process of this invention. In this post-impregnation steaming embodiment, the temperature can be up to 300° C. However, the crush resistance is not as high as with the pre-acid impregnation steaming and the crush resistance in the initial stage of treatment is very low giving rise to the risk of catalyst breakup.

The following Examples are set forth to further illustrate the invention but are not intended to limit it. Unless otherwise specified, throughout this specification and claims all parts and percentages are by weight.

EXAMPLE 1

A sample of 600 ml of grade 57 ID silica gel granules, manufactured by Davison Chemical Co., and having properties described as follows: pore volume 1.05 cc/g; surface area 350 m$^2$/g; average pore diameter 120 A; bulk density of about 27 lbs/ft$^3$; retained on 6 mesh; was selected for steam treatment. The gel was poured into a cylindrical pyrex glass liner which was then, in turn, placed into a stainless steel pressure vessel. The design operating conditions for the pressure vessel were pressures to 1000 psi and temperatures to 600° F. (ca 315° C.). The free volume with gel loaded was 495 ml.

After placing the glass liner charged with silica gel into the pressure vessel, an excess of liquid water (5.66 ml) was pipetted into the vessel but outside the liner. The pressure vessel was closed and sealed and pressurized to 450 psi (25° C.) with nitrogen from a pressure cylinder through a valve, which was then closed and disconnected from the pressure cylinder. The pressure vessel with valve was completely immersed in a fluidized sand bath preheated to 300° F. (ca 150° C.). The gel was thus surrounded by nitrogen and water vapor, the latter at a partial pressure of 67 psi. The total pressure was 705 psi. Treatment was continued for 16 hours after which the reactor was removed from the bath, vented to atmospheric pressure while still hot and then cooled. The effect of this treatment on the gel properties is shown in Table III.

TABLE III

| Treatment | Pore Volume cc/g | % Micropores 600 A pore dia.) | Crush Strength, lbs | |
|---|---|---|---|---|
| | | | Average | % ≤ 2 lbs |
| Non-steamed | 1.21 | 100 | 4.7 | 14 |
| Steamed | 1.16 | 96 | 6.0 | 14 |

The steam treatment resulted in an increased crush strength without appreciably lowering the microporosity. However, an even greater effect of the treatment is shown by properties of catalysts made from the treated gel as compared to the untreated gel.

Olefin hydration catalysts were made from the steamed and non-steamed 57 ID silica gel granules by immersing them in 55% aqueous $H_3PO_4$ for 2 hours, draining for 1 hour and then oven drying them at 110°–120° C. for 2 hours. The properties of these catalysts are shown in Table IV.

TABLE IV

| Treatment | Free $H_3PO_4$ lbs/ft$^3$ | Crush Strength, lbs | | | |
|---|---|---|---|---|---|
| | | Dry | | Wet With Water | |
| | | Av. | % ≤ 2 lbs | Av. | % ≤ 2 lbs |
| Non-steamed | 21.53 | 2.0 | 72 | 0.5 | 100 |
| Steamed | 21.19 | 9.8 | 4 | 4.5 | 24 |

Catalysts from the non-steamed gel had lost crush strength to a prohibitive degree for fixed bed operation. Its tendency to crush to powder under operating conditions and bed weight leads to an excessive pressure drop in the reactor. Furthermore, in the event that water condensation occurs during an upset in operating conditions, the crush strength becomes still lower, about 0.5 pounds. On the other hand, the catalyst from the steamed xerogel had a greater crush resistance, and in addition, an accidental wetting of the catalyst with liquid water will not ruin it since its average crush strength wet is still 4.5 pounds.

This improved catalyst is especially useful in the continuous fixed bed vapor phase hydration of olefins to the corresponding alcohols and ethers.

EXAMPLE 2

300 ml (262 g) of an olefin hydration catalyst of this invention was prepared as described in Example 1 and charged into a steel jacketed reactor. The reactor was then sealed and hot oil at 264° C. was circulated through the jacket to heat the catalyst. When the temperature of the bed reached 236° C., a mixture of ethylene and water in a mol ratio of water to ethylene of 0.54 was passed down through the bed at a vapor velocity of 28.5 SCFM/ft$^3$ catalyst and at a pressure of 10,000 psig. Reacted effluent gas was passed through a pneumatically operated valve which controlled reaction pressure and through which the effluent gas pressure was reduced to atmospheric.

As the reaction took place, a steady state was attained in which the bed temperatures near the top and bottom of the bed was 271° C. and 281° C., respectively, and the pressure was 1000 psi. For purposes of measuring catalyst activity under steady state conditions, effluent gas was diverted through a special route for exactly 1 hour for data collection. The effluent gas was cooled in a condenser using 20° C. water coolant and a liquid phase condensed comprised of the bulk of the alcohol synthesized along with water. Non-condensed gas was then passed through a washing tower in which liquid methanol was trickled down through the column countercurrent to the gas stream to wash out the ethanol and ether. These components were measured in the methanol wash by gas-liquid chromatography and were also recovered by distillation. It was found that the space time yield of alcohol and ether were 1.31 and 0.60 gallons (at 20° C.) per cubic foot catalyst per hour, respectively. The conversion of ethylene to ethanol was 6.43% and of ethylene to ether was 3.32%.

EXAMPLE 3

Preparation of the steamed silica xerogel described in Example 1 was repeated except that the volume of liquid water charged was 6.26 ml, the initial pressure was 421 psi and the temperature of the sand bath was 350° F. (ca 178° C.). The time was 16 hours. The partial pressure of water vapor in this case was 134 psi and the total pressure was 769 psi. The resulting gel had a pore volume of 1.05 cc/g, 19% micropores ( 600 A pore diameter), an average crush strength of 5.4 pounds and 10% had a crush strength of 2 pounds or less.

Catalyst was made from this gel by phosphoric acid impregnation following the procedure and conditions set forth in Example 1. The resulting catalyst had an average crush strength of 6.9 pounds, 4% had a crush strength  2 pounds, and the acid content was 22.72 pounds $H_3PO_4/ft^3$ catalyst. This improved catalyst is especially useful in the continuous fixed bed vapor phase hydration of olefins to the corresponding alcohol and ethers.

EXAMPLE 4

Example 2 was repeated using the catalyst of Example 3, a mol ratio of water to ethylene in feed of 0.56, a vapor velocity of 28.09 SCFM/ft$^3$ catalyst, a heating oil temperature of 266° C. and a reaction pressure of 1000 psi. The bed temperatures near the top and bottom of the vessel were 261° and 282° C., respectively. The space time yields of ethanol and ether were 1.81 and 0.51 gallons/ft$^3$ catalyst/hour, respectively. The conversion of ethylene to alcohol was 5.92% and of ethylene to ether was 2.89%.

EXAMPLE 5

A large scale insulated pressure reactor was charged with grade 57 ID silica gel. The reactor was closed and pressurized to 600 psi and then heated with a preheated continuously flowing mixture of ethylene and water keeping bed temperatures in the range of 300°–395° F. (ca 150°–200° C.) and keeping the partial pressure of water just below saturation [as a guide, the saturation temperature should be 10°–30° F. (ca 6°–17° C.) below the bed temperature]. After reaching final conditions, the treatment was carried out for a period of time less than 16 hours. At that point, water feed was stopped but gas circulation continued while the gas temperature was gradually lowered to cool the bed. When the bed had cooled to about 50° C., the reactor was depressurized and 55% aqueous $H_3PO_4$ was pumped into the reactor until the steam treated gel was completely immersed. Two hours later, the acid was drained off and the catalyst was found to have a crush strength, wet or dry, more than twice that of catalysts prepared from unsteamed gel. A substantial percentage of the pores were in the form of micropores of pore diameter of less than 600 A. The improved catalyst prepared in situ in this manner can be used in the continuous vapor phase hydration of olefins to the corresponding alcohols and ethers.

EXAMPLE 6

The olefin hydration catalyst prepared in situ in Example 5 was used in a continuous vapor phase process for the hydration of ethylene to ethanol and ether as follows. Preheated (to about 260° C.) ethylene and water vapor (mol ratio of water:ethylene of about 0.6) and, later, recycled gases, were compressed to about 900 psia and then continuously passed down through the catalyst bed at a vapor velocity near 30 SCFM/ft$^3$ catalyst, causing the bed to be heated to reaction temperature and finally by virtue of heat of reaction to a final steady state temperature. The effluent gaseous reaction mixture was cooled under pressure and the resultant liquid mixture separated in a high pressure separator. The vapor stream from the separator was sent to an alcohol scrubber where alcohol had been washed out with water and wash gas was sent to a recycled compressor and, after purging a small stream, was returned to the reactor. The wash solution was combined with the liquid phase from the high pressure separator and fed into an ether stripper column where ether and other like components were removed, sent to an off-gas compressor, the recycled compressor and ultimately recycled to the reactor.

The dilute alcohol solution from the bottom of the ether stripper was concentrated in a pre-rectifier column and then catalytically hydrogenated to convert by-product carbonyl groups to alcohol groups and saturate by-product unsaturated compounds for easy removal via distillation. Pre-rectifier column bottom were recycled to the alcohol scrubber column since these are essentially water. After hydrogenation, the alcohol was further purified by extractive distillation and rectified to continuously yield a high purity alcohol product. 55% aqueous $H_3PO_4$ solution was added to the bed at the top to replace acid loss from the bed.

EXAMPLE 7

A sample of 600 ml of Eagle Chemical Co. 3–12 mesh intermediate density silica gel granules having the following properties:

| | |
|---|---|
| BET Pore volume: | 0.97 cc/g |
| BET Surface area: | 326 m$^2$/g |
| Bulk density: | .40 g/ml (25 lb/ft$^3$) | was selected for steam treatment using the same apparatus as described in Example 1 for steam treating. Conditions for steam treatment were 325° F. (ca 162.78°C) for 16 hours at 600 psig with nitrogen saturated with water vapor at 300° F. (ca 148.89°C.).

The steam treated gel had an average crush strength of 5.6 pounds with 22%  2.0 pounds. 350 ml (142 g) of the steam treated gel were immersed in 55% aqueous $H_3PO_4$ for 2 hours, drained 1 hour and oven dried at 110° C. for 2 hours. The final weight was 172.6 g.

This material had a crush strength of 6.5 pounds with 14%  2.0 pounds. In contrast, catalyst prepared from unsteamed gel had an average crush strength of less than 2 pounds.

300 ml of the catalyst prepared from this steam treated gel were charged to the olefin hydration reaction described in Example 1 and used in the fixed bed continuous catalyst hydration of propylene with water to isopropanol and diisopropyl ether by the same procedure described in Example 1.

After charging catalyst and sealing the reactor, hot oil at 202° C. was circulated through the jacket to heat the catalyst. When the temperature of the bed reached 200° C., a mixture of propylene and water in a mol ratio of water to propylene of 0.65 was passed down through the bed at a vapor velocity of 47 SCFM/ft$^3$ catalyst, at a pressure of 370 psig. Reacted effluent gas passed through a pneumatically operated valve which controlled reaction pressure and through which effluent gas pressure was reduced to atmospheric. Phosphoric acid was continuously replaced at its loss rate using a dilute solution added at the top of the bed as a spray.

As reaction took place, a steady state was attained in which bed temperature near the top and bottom of the bed were 198° C. and 210° C., respectively, and pressure was 370 psi. For purposes of measuring catalyst activity under steady state conditions, effluent gas was diverted through a special route for exactly one hour for data collection. The effluent gas was then cooled in a condenser using 20° C. water coolant and a liquid phase condensed which was comprised of the bulk of the alcohol synthesized along with water. Non-condensed gas was then passed through a washing tower in which liquid methanol was trickled down the column countercurrent to the gas stream to wash out the isopropanol and isopropyl ether. These components were measured in the methanol wash by gas-liquid chromatography and were also recovered by distillation. The effluent propylene volume was measured. The isopropanol and isopropyl ether content of the condensed aqueous phase was also measured by gas chromatographic analysis, then recovered by distillation. The results after 3 hours were as follows: the space time yield of isopropyl alcohol was 2.36 gallons (at 20° C.)/ft$^3$ catalyst/hour, respectively. The conversions of propylene to isopropanol and isopropyl ether were 5.72 and .009%, respectively.

EXAMPLE 8

300 ml of fixed bed catalyst prepared as in Example 7 were used in the same system as Example 7 to continuously hydrate ethylene with water to ethanol and diethyl ether. Under conditions of top and bottom bed temperature, mol ratio ethylene to water, vapor velocity and reaction pressure of 293° C. and 306° C., 0.65, 32 SCFM/ft$^3$ catalyst and 1000 psi, the conversion of ethylene to ethanol and to diethyl ether was 5.94% and 0.81%, respectively, and the space time yields of alcohol and ether were 1.27 and 0.16 gallons (at 20° C.)/ft$^3$ catalyst/hour, respectively.

Various changes and modifications can be made in the process and products of this invention without departing from the spirit and the scope thereof. For example, while the catalyst of this invention has been described with respect to fixed bed use, it can also be used in a moving bed. The various embodiments disclosed herein were set forth for the purpose of illustration and were not intended to limit the invention.

I claim:

1. In a process of hydrating olefins to the corresponding alcohols by contacting the olefin and water vapor with a catalyst at elevated temperatures and pressures, the improvement which comprises employing as the catalyst, a $H_3PO_4$ impregnated silica xerogel, wherein said xerogel has a particle size passing through 3 mesh and retained on 20 mesh, a bulk density of 0.38–0.48 g/cc, a pore volume of 0.80–2.2 ml/g with 19–100% of the pores as micropores (diameter 600 A), a BET surface area in the range of 200–500 m$^2$/g, an average crush strength of 50 particles being not less than 4.4 pounds and has the following chemical composition in terms of weight percent dry basis: $SiO_2$ over 99%; $Fe_2O_3$ 0.01–0.03%; $Na_2O$ 0.02–0.09%; and $Al_2O_3$ less than 0.4%.

2. The process of claim 1 wherein the olefin is ethylene or propylene.

3. The process of claim 1 wherein the olefin is ethylene.

4. The process of claim 1 wherein the olefin is propylene.

5. The process of claim 1 wherein said xerogel is retained on 12 mesh and has a bulk density of 0.40–0.45 g/cc.

6. The process of claim 5 wherein the olefin is ethylene or propylene.

7. The process of claim 5 wherein the olefin is ethylene.

8. In a process of hydrating olefins to the corresponding alcohols by contacting the olefin and water vapor with a catalyst at elevated temperatures and pressures, the improvement which comprises employing as the catalyst, the product of the process which comprises contacting a $H_3PO_4$ impregnated silica xerogel with water vapor or a mixture of water vapor and an inert gas diluent at a total pressure of 40–1500 psi in which the partial pressure of water vapor is 40–225 psi and at a temperature within the range of 135°–300° C., wherein said xerogel has a particle size passing through 3 mesh and retained on 20 mesh, a bulk density of 0.38–0.48 g/cc, a pore volume of 0.80–2.2 ml/g with over 95% of the pores as micropores having an average pore diameter in the range of 100–200 A, a BET surface area in the range of 200–500 m$^2$/g, an average crush strength of 50 particles being not less than 2 pounds and having the following chemical composition in terms of weight percent dry basis: $SiO_2$ over 99%; $Fe_2O_3$ 0.01–0.03%; $Na_2O$ 0.02–0.09%; and $Al_2O_3$ less than 0.4%.

9. The process of claim 8 wherein the olefin is ethylene or propylene.

10. The process of claim 8 wherein the olefin is ethylene.

11. The process of claim 8 wherein said xerogel is retained on 12 mesh and has a bulk density of 0.40–0.45 g/cc.

12. The process of claim 11 wherein the olefin is ethylene.

* * * * *